(12) United States Patent
Mayer et al.

(10) Patent No.: US 11,708,105 B2
(45) Date of Patent: Jul. 25, 2023

(54) DETECTING DAMAGE TO COMPONENTS OF AN ELECTRIC POWER STEERING SYSTEM

(71) Applicant: Robert Bosch GmbH, Stuttgart (DE)

(72) Inventors: Sebastian Mayer, Minderoffingen (DE); Achim Frankovics, Novi, MI (US)

(73) Assignee: ROBERT BOSCH GMBH, Stuttgart (DE)

(*) Notice: Subject to any disclaimer, the term of this patent is extended or adjusted under 35 U.S.C. 154(b) by 659 days.

(21) Appl. No.: 16/788,152

(22) Filed: Feb. 11, 2020

(65) Prior Publication Data
US 2021/0245803 A1 Aug. 12, 2021

(51) Int. Cl.
| | |
|---|---|
| *B62D 5/04* | (2006.01) |
| *F16F 7/12* | (2006.01) |
| *B62D 15/02* | (2006.01) |
| *B60Q 9/00* | (2006.01) |
| *B62D 3/12* | (2006.01) |

(52) U.S. Cl.
CPC .......... *B62D 5/0481* (2013.01); *B60Q 9/00* (2013.01); *B62D 3/126* (2013.01); *B62D 15/0215* (2013.01); *F16F 7/12* (2013.01)

(58) Field of Classification Search
CPC .. B62D 5/0481; B62D 3/126; B62D 15/0215; B60Q 9/00; F16F 7/12
See application file for complete search history.

(56) References Cited

U.S. PATENT DOCUMENTS

| | | | |
|---|---|---|---|
| 6,257,563 B1* | 7/2001 | Oellers | F16F 1/3732 267/141.1 |
| 6,390,230 B1* | 5/2002 | Shimizu | B21K 1/767 180/444 |
| 6,543,570 B2 | 4/2003 | Parker | |
| 7,284,634 B2* | 10/2007 | Tatewaki | B62D 5/0424 180/443 |
| 7,493,984 B2* | 2/2009 | Ono | B62D 5/008 180/404 |
| 8,051,687 B2 | 11/2011 | De Carteret et al. | |
| 9,689,762 B2 | 6/2017 | Takahashi et al. | |

(Continued)

FOREIGN PATENT DOCUMENTS

| | | |
|---|---|---|
| CN | 1199682 A | 11/1998 |
| CN | 102753421 A | 10/2012 |

(Continued)

OTHER PUBLICATIONS

Translation of Chinese Search Report for Application No. 201910967159.3 dated Nov. 23, 2022 (4 pages).

*Primary Examiner* — Kevin Hurley
*Assistant Examiner* — Michael R Stabley
(74) *Attorney, Agent, or Firm* — Michael Best & Friedrich LLP

(57) ABSTRACT

An electric power steering system. The system includes a steering rack having a first end and a second end and at least one damper coupled to one of the first end and the second end. The system also includes an electronic controller configured to determine if the damper has been destroyed based upon a sensed steering angle being above a maximum steering angle threshold or based upon a received signal from an electrical circuit enclosed within the at least one damper.

20 Claims, 5 Drawing Sheets

(56) References Cited

U.S. PATENT DOCUMENTS

| | | | |
|---|---|---|---|
| 9,937,952 B2* | 4/2018 | Schnug | B62D 7/22 |
| 2006/0131096 A1* | 6/2006 | Ono | B62D 5/008 |
| | | | 180/400 |
| 2008/0017439 A1 | 1/2008 | Sawada et al. | |
| 2008/0243329 A1 | 10/2008 | Hamel et al. | |
| 2009/0120714 A1 | 5/2009 | Hisanaga et al. | |
| 2009/0150018 A1 | 6/2009 | Brown et al. | |
| 2010/0126795 A1 | 5/2010 | Tokunaga | |
| 2011/0024224 A1 | 2/2011 | Mori et al. | |
| 2013/0179037 A1 | 7/2013 | Ebihara et al. | |
| 2016/0167701 A1 | 6/2016 | Sone et al. | |
| 2016/0347360 A1* | 12/2016 | Schnug | B62D 1/16 |
| 2017/0305458 A1 | 10/2017 | Wang et al. | |
| 2018/0127021 A1 | 5/2018 | Wang et al. | |
| 2018/0237056 A1 | 8/2018 | Bremkens et al. | |
| 2019/0023313 A1 | 1/2019 | Zuzelski et al. | |
| 2019/0355187 A1 | 11/2019 | Frankovics et al. | |
| 2021/0245803 A1 | 8/2021 | Mayer et al. | |

FOREIGN PATENT DOCUMENTS

| | | |
|---|---|---|
| CN | 108367776 A | 8/2018 |
| CN | 108569334 A | 9/2018 |
| WO | 2017102375 A1 | 6/2017 |

* cited by examiner

DETECTING DAMAGE TO COMPONENTS OF AN ELECTRIC POWER STEERING SYSTEM

BACKGROUND

In electric power steering ("EPS") systems, an electric motor drives a gear to provide extra torque to a steering rack to assist in turning wheels of a vehicle. In general, EPS systems include many mechanically and electrically connected components. These components may be damaged if the vehicle collides with external objects (for example, curbs, potholes, and other vehicles). Often, a user of the vehicle may not be aware that an EPS system is damaged after a collision with an external object.

SUMMARY

As noted, damage to an EPS system may go undetected. As a consequence, a system is needed to detect potential damage to components of the EPS system based on operating parameters of the components. For example, as explained in more detail below, components may suffer impact forces from external objects. These forces can be detected by damage caused to dampers attached to components of the EPS system. By detecting the damage to the dampers, the system can determine if components may be damaged.

Embodiments described herein therefore relate to an electric power steering system.

One embodiment provides an electric power steering system. In one example, the system includes a steering rack having a first end and a second end and at least one damper coupled to one of the first end and the second end. The system also includes a steering angle sensor and an electronic controller configured to receive steering angle data from the steering angle sensor, compare the steering angle data to a threshold, and determine if the at least one damper has been damaged based upon the comparison.

Another embodiment provides an electric power steering system. The system includes a steering rack having a first end and a second end and at least one damper coupled to one of the first end and the second end, the at least one damper including an electrical circuit. The system also includes an electronic controller communicatively coupled to the electrical circuit, the electronic controller configured to receive a signal from the electrical circuit, and based upon the signal, determine if the at least one damper has been damaged.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable media) executable by one or more electronic controllers. For example, "control units" and "controllers" described in the specification can include one or more electronic controllers, electronic processors, or similar devices, one or more memories including non-transitory computer-readable media, one or more input/output interfaces, one or more application specific integrated circuits (ASICs) and other circuits, and various connections (for example, wires, printed traces, and busses) connecting the various components.

Figure 1:
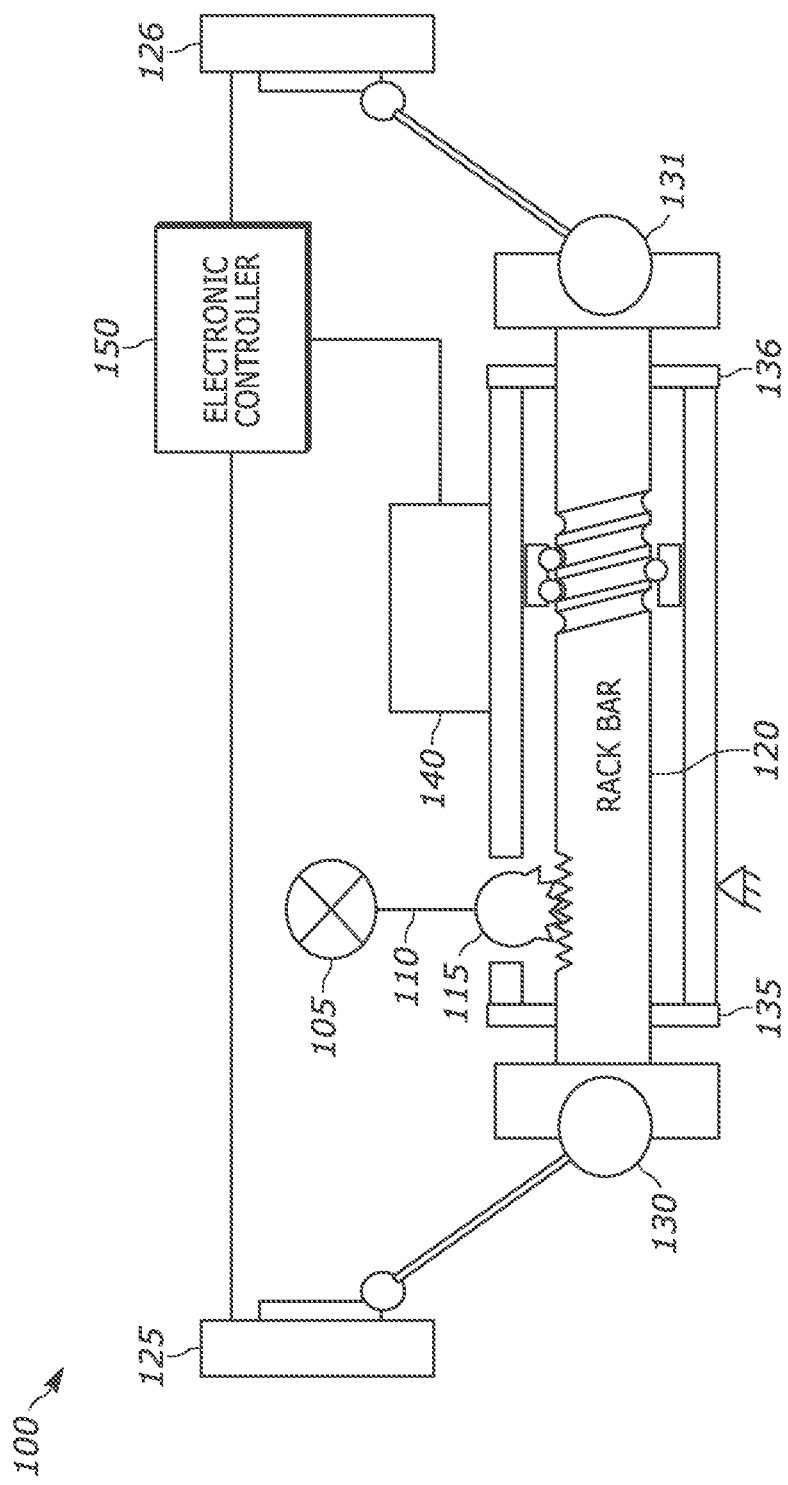
FIG. 1 illustrates an electric power steering system according to one embodiment.

FIG. 1 illustrates an electric power steering ("EPS") system 100 of a vehicle according to one embodiment. The EPS system 100 includes a steering control 105 (for example, a steering wheel) connected via a steering shaft 110 to a steering pinion 115. However, in embodiments where the vehicle includes a "steer by wire" system, the steering shaft 110 may not be present. Instead, a sensor detects an amount of requested steering from the steering control 105 and, based upon the detected amount of requested steering, a controller operates the pinion 115 as described below.

The steering pinion 115 may be, for example, a steering gear. When a user operates the steering control 105, the steering pinion 115 turns and moves a steering rack 120 in a desired steering direction. The movement of the steering rack 120 then turns wheels 125 and 126 to turn the vehicle in the desired steering direction. In some embodiments, the wheels 125 and 126 are front wheels of the vehicle. In other embodiments, the wheels 125 and 126 are rear wheels of the vehicle.

The wheels 125 and 126 are connected to the steering rack 120 via ball joints 130 and 131. When the steering rack 120 is moved by the steering pinion 115, the ball joints 130 and 131 move the wheels 126 and 126 (for example, turning the wheels in the desired steering direction). As the steering rack 120 approaches a maximum steering rack travel distance (for example, how far left or right the steering rack 120 can be moved by the steering pinion 115), the ball joints 130 and 131 impact dampers 135 and 136, respectively. The dampers 135 and 136 are provided at either end of the steering rack 120 (e.g., at a first end and a second end of the steering rack 120) to prevent damage to the steering rack 120 in the event the ball joints 130 and 131 turn the wheels 125 and 126 too far or if outside forces are applied via the ball joints 130 and 131 to the steering rack 120, as illustrated in further detail below.

The dampers 135 and 136 are made of plastic in one embodiment. In other embodiments, the dampers 135 and 136 are made of some combination of plastic, rubber, and metal. When the dampers 135 and 136 experience critically-high rack forces (e.g., a force higher than a threshold force) from the ball joints 130 and/or 131, the dampers 135 and 136 are designed to be destroyed, or for at least a portion of the dampers 135 and 136 to be destroyed. In this instance, destroyed means to be deformed. In general, a portion of the dampers 135 and 136 are deformed such that the steering rack 120 is allowed more freedom of movement without completely breaking the dampers 135 and 136 into two or more pieces that may then be loose in the ball joint 131. The material selected to make the dampers is selected based on the desired threshold force. For example, a material may be selected based upon a maximum impact force necessary, such as 20-30 kilonewtons, to destroy the dampers 135 and 136.

Figure 2A:
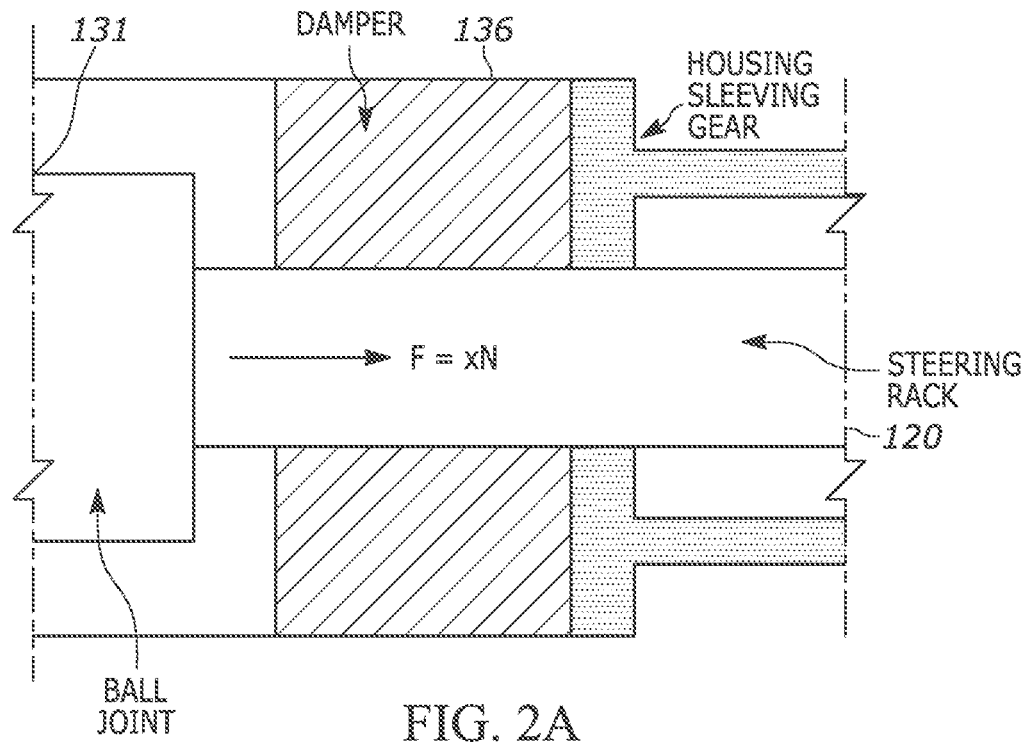
FIG. 2A illustrates a damper according to one embodiment.

An example damper 136 is illustrated in FIG. 2A. Ball joint 131 connects to the steering rack 120 and imparts a rack force onto the steering rack 120 when the ball joint 131 receives an impact from the respective wheel 126 of the ball joint 131. If the force imparted by the impact of the ball join 131 onto the steering rack 120 is above a maximum impact force threshold, the damper 136 is destroyed.

A higher steering angle (for example, the angle the wheels 125 and 126 can be turned) is possible once the dampers 135 and 136 are destroyed. Therefore, a user of the vehicle may notice that the wheels 125 and 126 turn more, which indicates damage to the EPS system 100. In some embodiments, each of the wheels 125 and 126 has a sensor that determines how far each of the wheels 125 and 126 turns, and then communicates the angle of the turn to an electronic controller (as discussed below). The angle of the turn may be compared to a threshold angle value. When the angle is greater than the threshold angle value, the electronic controller indicates to the user that the dampers 135 and 136 have been destroyed. In another embodiment, a steering angle sensor 138 may detect a steering angle from the steering control 105, the steering shaft 110, or the steering pinion 115, or at least one of the wheels 125 and 126.

Figure 2B:
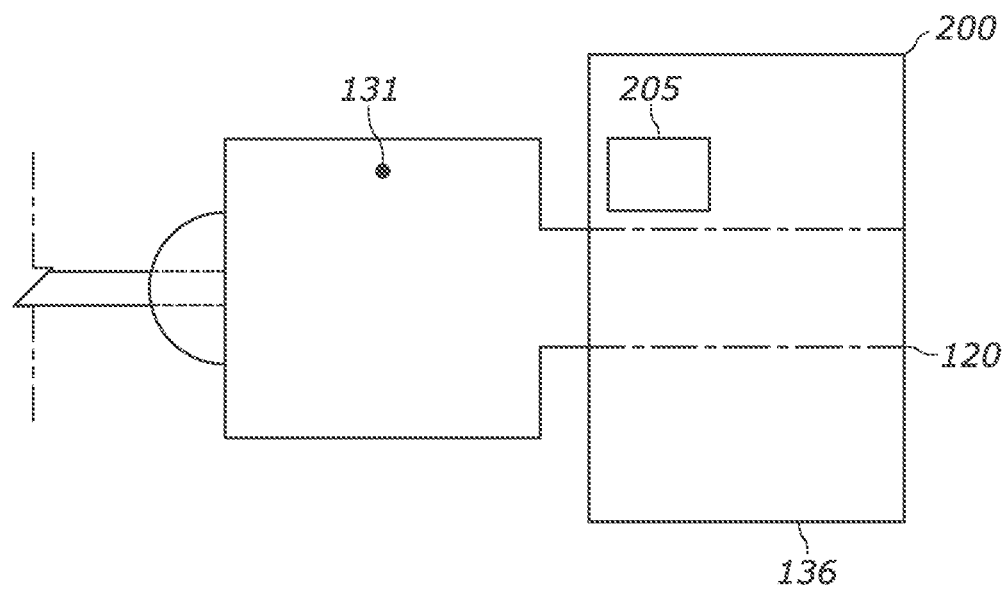
FIG. 2B illustrates a damper including an electrical circuit according to one embodiment.

In some embodiments, the dampers 135 and 136 include an electrical circuit enclosed within the dampers 135 and 136. For example, FIG. 2B illustrates a sensor assembly 200 for the ball joint 131. The sensor assembly 200 includes the damper 136, and the damper 136 includes an electrical circuit 205. The electrical circuit 205 may simply be a switch or may include more complex circuitry, such as a wireless transceiver, an antenna, and the like. The electrical circuit 205 is communicatively connected, via a wireless or wired connection, to an electronic controller as described below, and sends a signal to the electronic controller, such as a logical high signal or a closed circuit signal. When the ball joint 131 impacts the steering rack 120 with a force above the maximum impact force threshold, the damper 136 is destroyed, including the electrical circuit 205. When the electrical circuit 205 is destroyed, a signal, such as a logical low signal or an open circuit signal, is received by the electronic controller as described below.

Returning to FIG. 1, the EPS system 100 also includes an electric motor 140. The electric motor 140 is used to provide an extra torque to move the steering rack 120 (in addition to torque from the steering pinion 115) to assist in turning the wheels 125 and 126. The amount of extra torque applied by the electric motor 140 is determined based upon a user input (for example, an amount a user turns the steering control 105).

Figure 3:
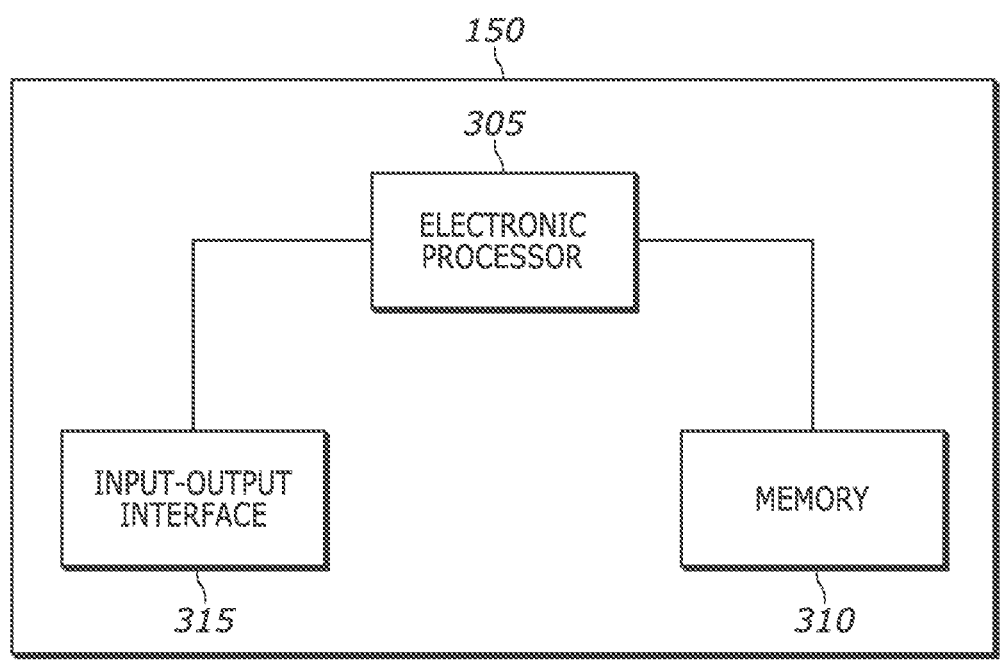
FIG. 3 illustrates an electronic controller according to one embodiment.

The EPS system 100 also includes an electronic controller 150. FIG. 3 is an illustrative example of the electronic controller 150. The electronic controller 150 includes a plurality of electrical and electronic components that provide power, operation control, and protection to the components and modules within the electronic controller 150. In the example illustrated, the electronic controller 150 includes an electronic processor 305 (for example, a programmable electronic microprocessor, microcontroller, or similar device), a memory 310 (for example, non-transitory, machine-readable memory), and an input-output interface 315. The electronic processor 305 is communicatively connected to the memory 310 and the input-output interface 315. The electronic processor 305, in coordination with software stored in the memory 310 and the input-output interface 315, is configured to implement, among other things, the methods described herein.

The electronic controller 150, in some embodiments, may be implemented in several independent controllers (for example, programmable electronic control units) each configured to perform specific functions or sub-functions. Additionally, the electronic controller 150 may contain sub-modules that include additional electronic processors, memory, or application-specific integrated circuits (ASICs) for handling input-output functions, processing of signals, and application of the methods listed below. In other embodiments, the electronic controller 150 includes additional, fewer, or different components.

The electronic controller 150 is electronically connected to the steering angle sensor 138 and is configured to receive steering angle data from the steering angle sensor 138.

The electronic controller 150 is communicatively connected to the electrical circuit 205 described with reference to FIG. 2B above. In one embodiment, the electronic controller 150 includes a wired connection through the sensor assembly 200 to the electrical circuit 205 and receives a logical signal from the electrical circuit 205. In another embodiment, the electronic controller 150 includes a wireless connection to the electrical circuit through, for example, an antenna or other wireless transceiver. The wireless connection may be a Bluetooth connection, a Wi-Fi connection, a Long Term Evolution ("LTE") connection, or other appropriate wireless connection. The electronic controller 150 is configured to receive over the wireless connection a logical signal from the electrical circuit 205.

Figure 4:
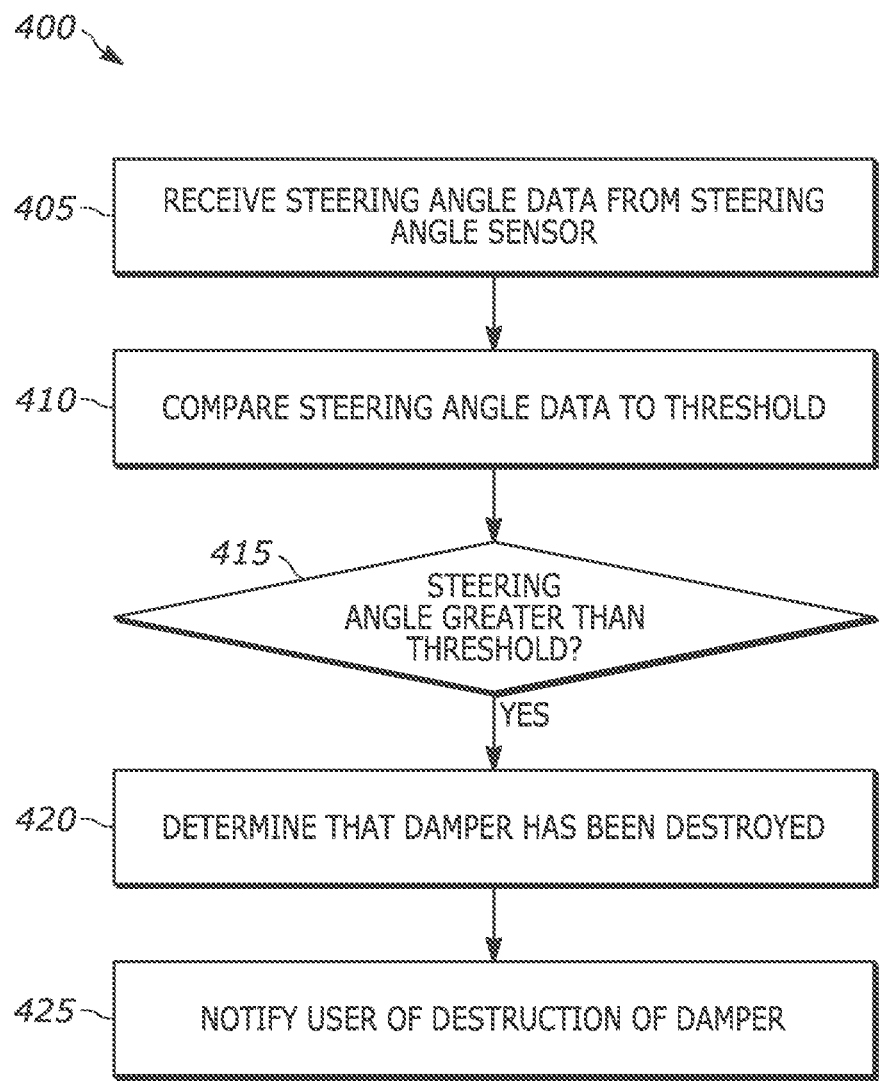
FIG. 4 is a flowchart illustrating a method for determining if a damper has been destroyed according to one embodiment.

FIG. 4 is a flowchart illustrating a method 400 for detecting if one of the dampers 135 and 136 has been destroyed according to one embodiment. The method 400 includes receiving, with the electronic controller 150, steering angle data from the steering angle sensor 138 (at block 405). The steering angle data may be detected by the steering angle sensor 138 from the steering control 105, the steering shaft 110, or the steering pinion 115. For example, the steering angle sensor 138 may detect an amount of rotation of the steering shaft 110 or of the steering control 105 and transmit the steering angle data to the electronic controller 150.

The method 400 also includes comparing, with the electronic controller 150, the received steering angle data to a steering angle threshold (at block 410). A vehicle's turn radius is may be limited by the amount of motion allowed by the steering rack 120. If the dampers 135 and 136 are destroyed by an impact of the ball joints 130 and 131, the freedom of movement (and therefore the available steering angle) of the steering rack 120 is increased, but damage may have been done to one of the components of the EPS system 100, such as damage being done to the steering pinion 115.

If the detected steering angle is below the steering angle threshold, the electronic controller 115 takes no action. If the detected steering angle is above the steering angle threshold (block 415), the electronic controller 115 determines that one of the dampers 135 and 136 has been destroyed (block 420). In other words, if the maximum allowable steering angle allowed by the dampers 135 and 136 being intact is exceed, the electronic controller 150 determines that at least one of the dampers 135 and 136 has been destroyed.

In embodiments where the two dampers 135 and 136 are coupled to the first and second ends of the steering rack 120, the electronic controller 150 is configured to determine which of the dampers 135 and 136 has been destroyed. In one embodiment, the steering angle sensor 138 detects an amount of rotation and a direction of rotation of the steering shaft 110. A steering angle is determined based upon the amount of rotation and compared to the steering angle threshold. If the current steering angle is greater than the threshold, the electronic controller 150 determines that one of the dampers 135 and 136 has been destroyed. The electronic controller 150 then determines which of the dampers 135 and 136 has been destroyed based upon the direction of rotation. For example, if the steering shaft 110 has rotated counterclockwise, it is determined that the damper 135 has been destroyed.

The method 400 also includes notifying, with the electronic controller 150, a user of a vehicle including the EPS 100 when at least one of the dampers 135 and 136 has been destroyed (at block 425). For example, the electronic controller 150 may send a message to be displayed on a display screen of the vehicle indicating that one of the dampers 135 and 136 has been destroyed, send a message to a remote server or a mobile device indicating that one of the dampers 135 and 136 has been destroyed, or notify the user in some other manner. When the user is notified of the destruction of one of the dampers 135 and 136, the user can then take actions to determine if any damage has occurred to other components of the EPS 100.

Figure 5:
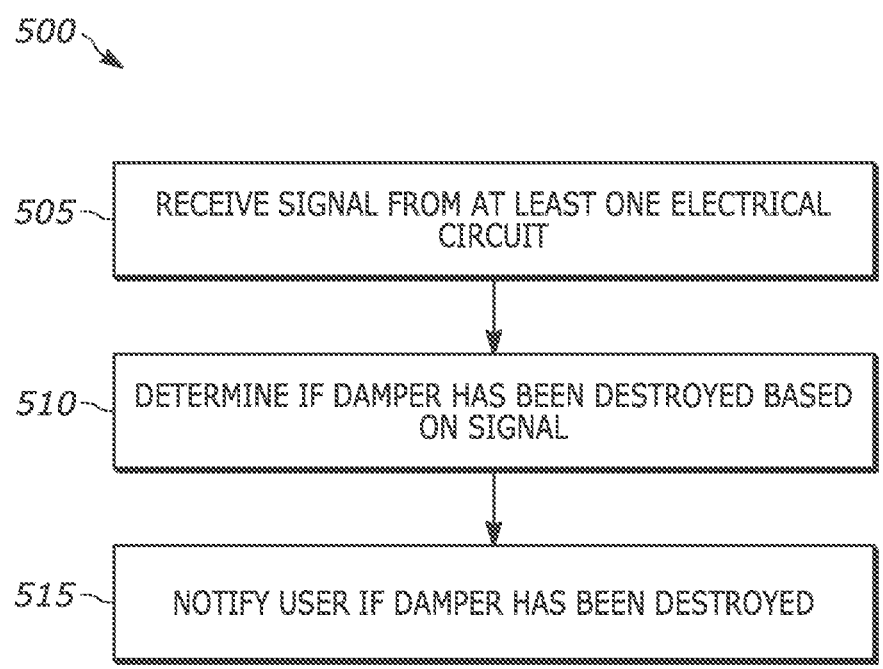
FIG. 5 is a flowchart illustrating a method for determining if a damper has been destroyed according to one embodiment.

FIG. 5 illustrates a method 500 for determining if one of the dampers 135 and 136 has been destroyed according to one embodiment. The method 500 includes receiving, with the electronic controller 150, a signal from the electrical circuit 205 (block 505). In one embodiment, while the dampers 135 and 136 are intact, the electronic controller 150 receives a logical high signal or a closed circuit signal, indicating that the electrical circuit 205 in both dampers 135 and 136 are still intact.

If one of the dampers 135 and 136 is destroyed by an impact from the respective ball joint 130 and 131, the received signal from the destroyed damper changes from a logical high or a closed circuit signal to a logical low or an open circuit signal or a lack of signal in the case of a wireless connection between the electronic controller 150 and the electrical circuit 205. Based upon the signal changing, the electronic controller 150 determines that one of the dampers 135 and 136 has been destroyed (block 510). In one embodiment, each electrical circuit 205 of the dampers 135 and 136 sends a unique signal (for example, a first signal sent from the electrical circuit 205 of the damper 135 and a second signal sent from the electrical circuit 205 of the damper 136) to the electronic controller 150. Based upon which of the first signal and the second signal changes, the electronic controller 150 determines which of the dampers 135 and 136 has been destroyed.

The electronic controller 150 then notifies a user of a vehicle equipped with the EPS 100 if one of the dampers 135 and 136 has been destroyed. For example, the electronic controller 150 may send a message to be displayed on a display screen of the vehicle indicating that one of the dampers 135 and 136 has been destroyed, send a message to a remote server or a mobile device indicating that one of the dampers 135 and 136 has been destroyed, or notify the user in some other manner. When the user is notified of the destruction of one of the dampers 135 and 136, the user can then take actions to determine if any damage has occurred to other components of the EPS 100.

The following examples illustrate example systems and methods described herein.

Example 1: an electric power steering system, the system comprising a steering rack having a first end and a second end; at least one damper coupled to one of the first end and the second end; a steering angle sensor; and an electronic controller configured to receive steering angle data from the steering angle sensor; compare the steering angle data to a threshold, and determine if the at least one damper has been destroyed based upon the comparison.

Example 2: the system of example 1, the system further comprising a steering shaft, a steering control, and at least one wheel.

Example 3: the system of example 2, wherein the steering angle sensor detects the steering angle data from at least one of the steering shaft, the steering control, and the at least one wheel.

Example 4: the system of any of examples 1-3, wherein the at least one damper is made of plastic, rubber, metal, or a combination of plastic, rubber, or steel.

Example 5: the system of any of examples 1-4, wherein the at least one damper is determined to be destroyed based upon the steering angle data being greater than the threshold.

Example 6: the system of any of examples 1-5, further comprising a second damper, and wherein the at least one damper is coupled to the first end and the second damper is coupled to the second end.

Example 7: the system of example 6, the electronic controller further configured to determine which of the at least one damper and the second damper was destroyed based upon the steering angle data.

Example 8: the system of any of examples 1-7, the electronic controller further configured to notify a user if the at least one damper has been destroyed.

Example 9: the system of any of examples 1-8, wherein the at least one damper is destroyed when the steering rack experiences a rack force higher than a threshold force.

Example 10: the system of example 9, wherein the steering rack experiences the rack force from a ball joint coupled to the steering rack.

Example 11: an electric power steering system, the system comprising a steering rack having a first end and a second end; at least one damper coupled to one of the first end and the second end, the at least one damper including an electrical circuit; and an electronic controller communicatively coupled to the electrical circuit, the electronic controller configured to receive a signal from the electrical circuit; and based upon the signal, determine if the at least one damper has been destroyed.

Example 12: the system of example 11, wherein the electronic controller is communicatively coupled to the electrical circuit with a wired connection.

Example 13: the system of any of examples 11-12, wherein the electronic controller is communicatively coupled to the electrical circuit with a wireless connection.

Example 14: the system of example 13, wherein the electrical circuit includes a wireless transceiver.

Example 15: the system of any of examples 11-14, wherein the at least one damper is destroyed when the steering rack experiences a rack force higher than a threshold force.

Example 16: the system of any of examples 11-15, further comprising a second damper, and wherein the at least one damper is coupled to the first end and the second damper is coupled to the second end.

Example 17: the system of example 16, wherein the second damper includes a second electrical circuit, and wherein the second electrical circuit is communicatively coupled to the electronic controller.

Example 18: the system of example 17, wherein the electronic controller is configured to determine which of the at least one damper and the second damper has been destroyed based upon the signal received from the electrical circuit or a second signal received from the second electrical circuit.

Example 19: the system of any of examples 11-18, wherein the electronic controller is further configured to notify a user if the at least one damper is destroyed.

Example 20: the system of any of examples 11-19, wherein the at least one damper is made of plastic, rubber, metal, or some combination of plastic, rubber, or metal.

Thus, embodiments described herein describe an electric power steering system.

Various features, advantages, and embodiments are set forth in the following claims.

What is claimed is:

1. An electric power steering system, the system comprising:
   a steering rack having a first end and a second end;
   at least one damper coupled to at least one selected from the group consisting of the first end and the second end;
   a steering angle sensor; and
   an electronic controller configured to
      receive steering angle data from the steering angle sensor;
      compare the steering angle data to a threshold, and
      determine if the at least one damper has been destroyed based upon the comparison and a direction of rotation associated with the at least one damper.

2. The system of claim 1, the system further comprising a steering shaft, a steering control, and at least one wheel.

3. The system of claim 2, wherein the steering angle sensor detects the steering angle data from at least one of the steering shaft, the steering control, and the at least one wheel.

4. The system of claim 1, wherein the at least one damper is made of plastic, rubber, metal, or some combination of plastic, rubber, or metal.

5. The system of claim 1, wherein the at least one damper is determined to be destroyed based upon the steering angle data being greater than the threshold.

6. The system of claim 1, further comprising a second damper, and wherein the at least one damper is coupled to the first end and the second damper is coupled to the second end.

7. The system of claim 6, the electronic controller further configured to determine which of the at least one damper and the second damper was destroyed based upon the steering angle data.

8. The system of claim 1, the electronic controller further configured to notify a user if the at least one damper has been destroyed.

9. The system of claim 1, wherein the at least one damper is destroyed when the steering rack experiences a rack force higher than a threshold force.

10. The system of claim 9, wherein the steering rack experiences the rack force from a ball joint coupled to the steering rack.

11. An electric power steering system, the system comprising:
    a steering rack having a first end and a second end;
    at least one damper coupled to one of the first end and the second end, the at least one damper including an electrical circuit; and
    an electronic controller communicatively coupled to the electrical circuit, the electronic controller configured to
       receive a signal from the electrical circuit; and
       based upon the signal, determine if the at least one damper has been destroyed.

12. The system of claim 11, wherein the electronic controller is communicatively coupled to the electrical circuit with a wired connection.

13. The system of claim 11, wherein the electronic controller is communicatively coupled to the electrical circuit with a wireless connection.

14. The system of claim 13, wherein the electrical circuit includes a wireless transceiver.

15. The system of claim 11, wherein the at least one damper is destroyed when the steering rack experiences a rack force higher than a threshold force.

16. The system of claim 11, further comprising a second damper, and wherein the at least one damper is coupled to the first end and the second damper is coupled to the second end.

17. The system of claim 16, wherein the second damper includes a second electrical circuit, and wherein the second electrical circuit is communicatively coupled to the electronic controller.

18. The system of claim 17, wherein the electronic controller is configured to determine which of the at least one damper and the second damper has been destroyed based upon the signal received from the electrical circuit or a second signal received from the second electrical circuit.

19. The system of claim 11, wherein the electronic controller is further configured to notify a user if the at least one damper is destroyed.

20. The system of claim 11, wherein the at least one damper is made of plastic, rubber, or metal, or some combination of plastic, rubber, or metal.

* * * * *